United States Patent [19]

Boerckel et al.

[11] Patent Number: 4,735,531
[45] Date of Patent: Apr. 5, 1988

[54] ACOUSTIC TILE CUTTING ASSEMBLY

[75] Inventors: David A. Boerckel, Dunkirk; Lawrence H. Boerckel, Prince Frederick, both of Md.

[73] Assignee: L & D Sales, Inc., Dunkirk, Md.

[21] Appl. No.: 97,692

[22] Filed: Sep. 17, 1987

[51] Int. Cl.$^4$ .......................... B23C 1/20; B23C 5/10
[52] U.S. Cl. ............................. 409/182; 144/134 D; 144/136 C
[58] Field of Search .......... 144/134 R, 134 D, 134 A, 144/136 R, 136 C, 137; 409/137, 182, 218; 83/471.2, 574

[56] References Cited

U.S. PATENT DOCUMENTS

| | | | |
|---|---|---|---|
| 2,827,836 | 3/1958 | Horth et al. | 409/182 |
| 2,965,144 | 12/1960 | Lowenthal | 144/218 |
| 3,450,001 | 6/1969 | Fortune | 144/136 C |
| 3,770,031 | 11/1973 | Olson | 144/136 R |
| 3,782,431 | 1/1974 | Cox | 144/144.5 |
| 3,827,468 | 8/1974 | Markham | 144/136 R |
| 4,194,543 | 3/1980 | Cotton | 144/136 C |
| 4,215,731 | 8/1980 | Maynard | 144/136 C |
| 4,434,824 | 3/1984 | Bussey | 144/134 D |
| 4,630,656 | 12/1986 | Collins | 409/182 |
| 4,651,814 | 12/1985 | Dahlgren, Jr. et al. | 409/80 |
| 4,688,613 | 8/1987 | Bassett | 144/136 C |

FOREIGN PATENT DOCUMENTS

| | | | |
|---|---|---|---|
| 2033524 | 3/1970 | Fed. Rep. of Germany | 144/38 |
| 2037655 | 7/1980 | United Kingdom | 144/136 C |

Primary Examiner—W. Donald Bray
Attorney, Agent, or Firm—Brady, O'Boyle & Gates

[57] ABSTRACT

A router guide assembly which permits rectilinear movement of a router for cutting acoustic tile panels while providing a reveal edge along the cut edges. Quick and easy movement is provided by two railed carriage sub assemblies, one of which is carried by the other. Manually activated mechanical stops are provided on each carriage for selectively preventing movement in either orthogonal direction so that a linear cut can be made in the other direction. Lock down devices are included for holding a tile in place. The assembly also includes a plastic housing and skirt attached to the underside of a router mounting plate for collecting and directing the sawdust resulting from the cutting of a tile to a location remote from the router guide assembly. Numerical measuring scales are selectively located on the assembly and include calibrations so that a required offset for bit size is automatically included when measuring for a particular cut.

17 Claims, 7 Drawing Sheets

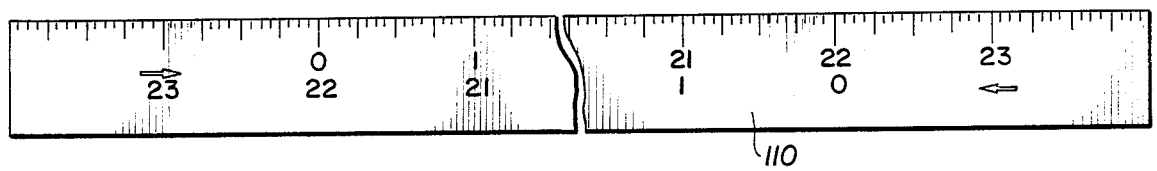
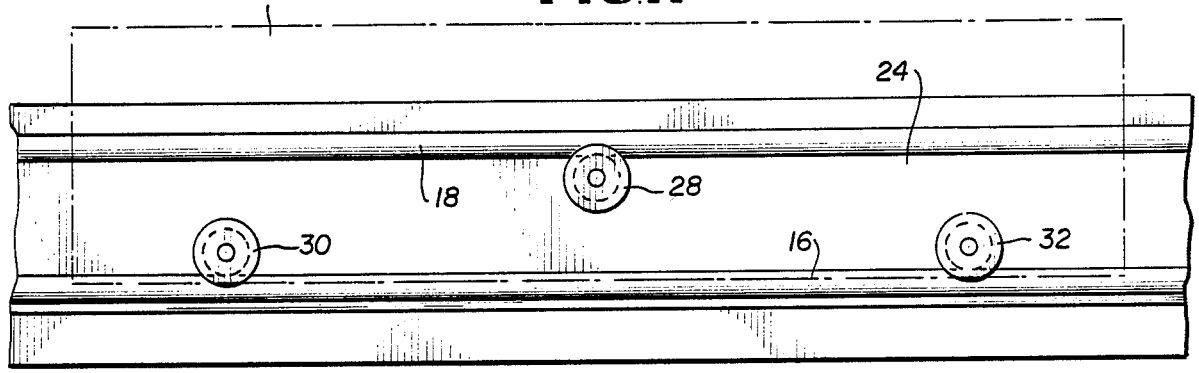
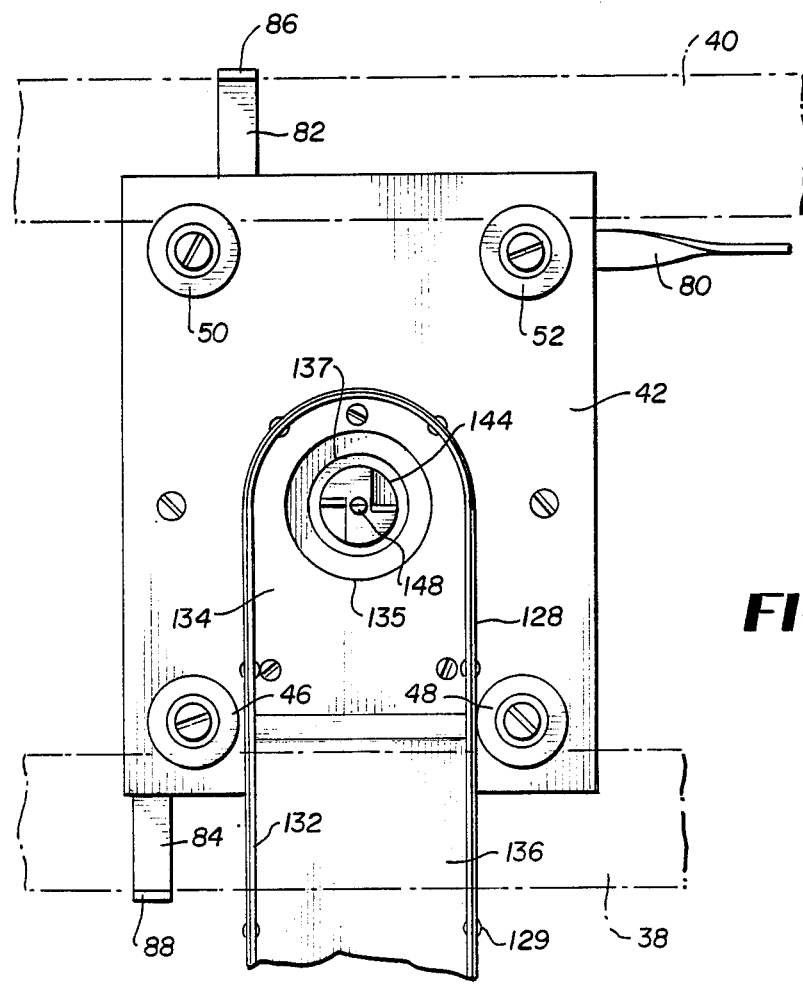

ACOUSTIC TILE CUTTING ASSEMBLY

BACKGROUND OF THE INVENTION

This invention relates to apparatus for performing selected cuts on flat panel type workpieces and more particularly to an assembly or fixture for use with a router for performing linear cuts on an acoustic tile with the cut edges including a reveal edge.

Router guide assemblies are well known and typically involve a structure for securing a workpiece between mutually orthogonal linearly movable carriages, one of which supports the router for performing routing, cutting or grooving operations in the surface of a workpiece. Typical examples of such apparatus are shown in U.S. Pat. No. 3,770,031, E. T. Olson; U.S. Pat. No. 3,827,468, O. A. Markham; and U.S. Pat. No. 4,215,731, D. E. Maynard.

It is an object of the present invention, therefore, to provide an improvement in routing fixtures or tables for quickly and accurately cutting a workpiece clamped in place thereon.

It is another object of the invention to provide a portable routing fixture or assembly that permits cross cuts to be made on acoustic tile while automatically providing a reveal edge thereon.

A further object of the invention is to provide an acoustic tile cutting assembly which automatically compensates for offsets required to be made in the measurement for a particular cut.

Still another object of the invention is to provide a router assembly for cutting acoustic tile which directs the dust and debris away from the cutting tool to provide a clean and safe environment during its operation.

And yet another object of the invention is to provide a router assembly for cutting acoustic tiles quickly, easily and efficiently without the need for extensive knowledge or ability.

SUMMARY

Briefly, the foregoing and other objects of the invention are accomplished by a router guide assembly for cutting acoustic tiles with the resulting cut having a reveal edge. The apparatus is comprised of, among other things, a base structure having mutually orthogonal rail mounted carriages mounted thereon. Both carriages include manually activated stop mechanisms for selectively preventing movement in either of the two mutually orthogonal linear directions. Clamps are provided to hold a piece of acoustical tile in place which is thereafter cut in two by a router mounted on the movable carriage which is adapted to move laterally across the assembly. The carriage containing the router includes an elongated housing attached to the underside thereof adjacent the router bit for collecting and directing the dust resulting from a tile cut to an outlet located at the outer end which is connected to a vacuum hose where it is carried to a dust bag or some such container. Linear measurement scales are provided on one longitudinal side and across one cross member and are calibrated to automatically include an offset so that desired sizes of cuts can be automatically made with the resulting edges having a reveal edge so as to fit into a conventional acoustic tile ceiling grid structure.

BRIEF DESCRIPTION OF THE DRAWINGS

The objects of the present invention and the attendant advantages thereof will become more readily apparent with reference to the following drawings wherein:

FIG. 5 is a partial cross sectional view of the invention taken along the lines 5—5 of FIG. 3;

FIG. 10 is a fragmented top planar view of the scale utilized to measure transverse router position;

FIG. 11 is a partial cross sectional view taken along the lines 11—11 of FIG. 3;

DETAILED DESCRIPTION OF THE PREFERRED EMBODIMENT

Figure 1:
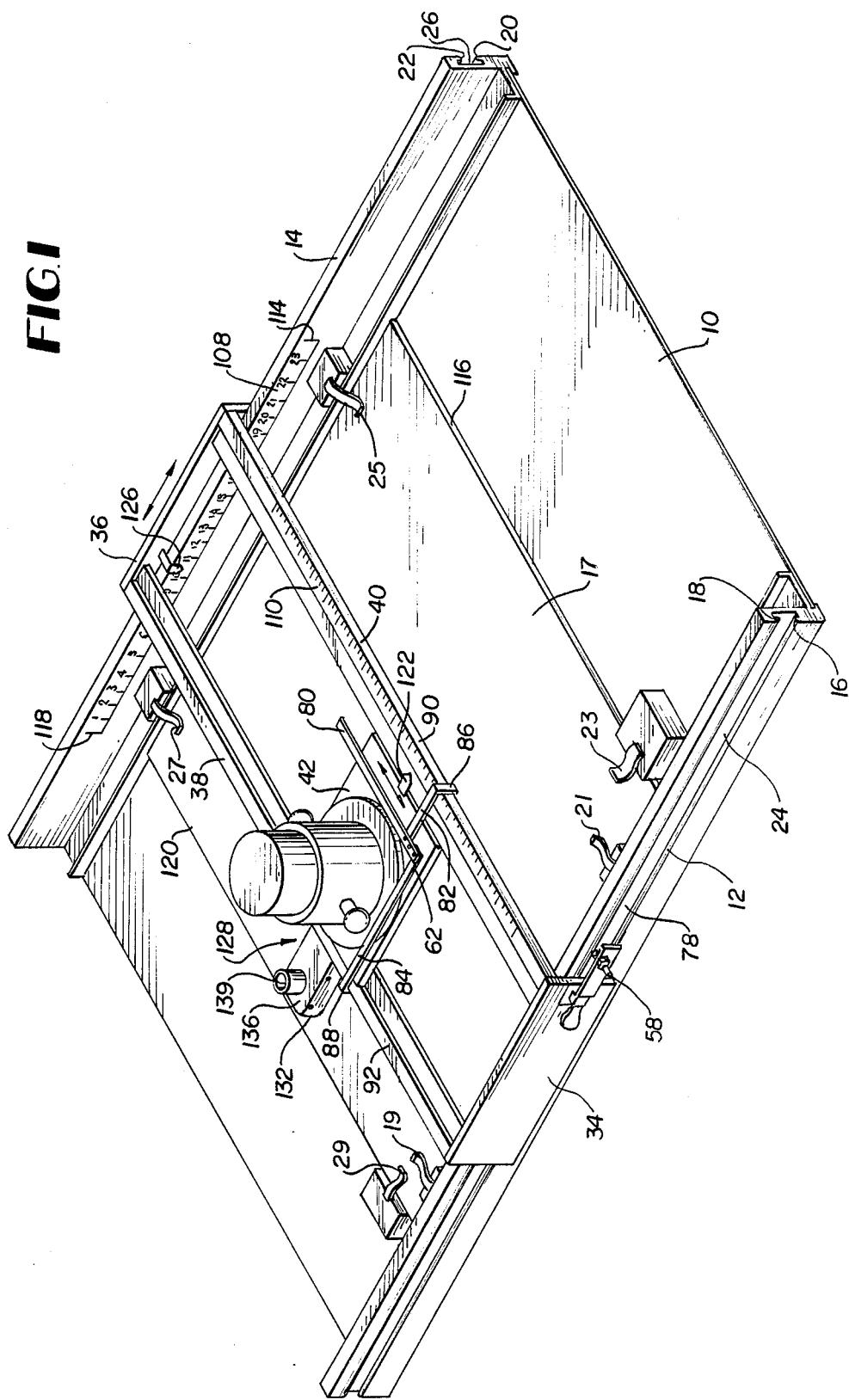
FIG. 1 is a perspective view generally illustrative of the preferred embodiment of the subject invention.
Figure 2:
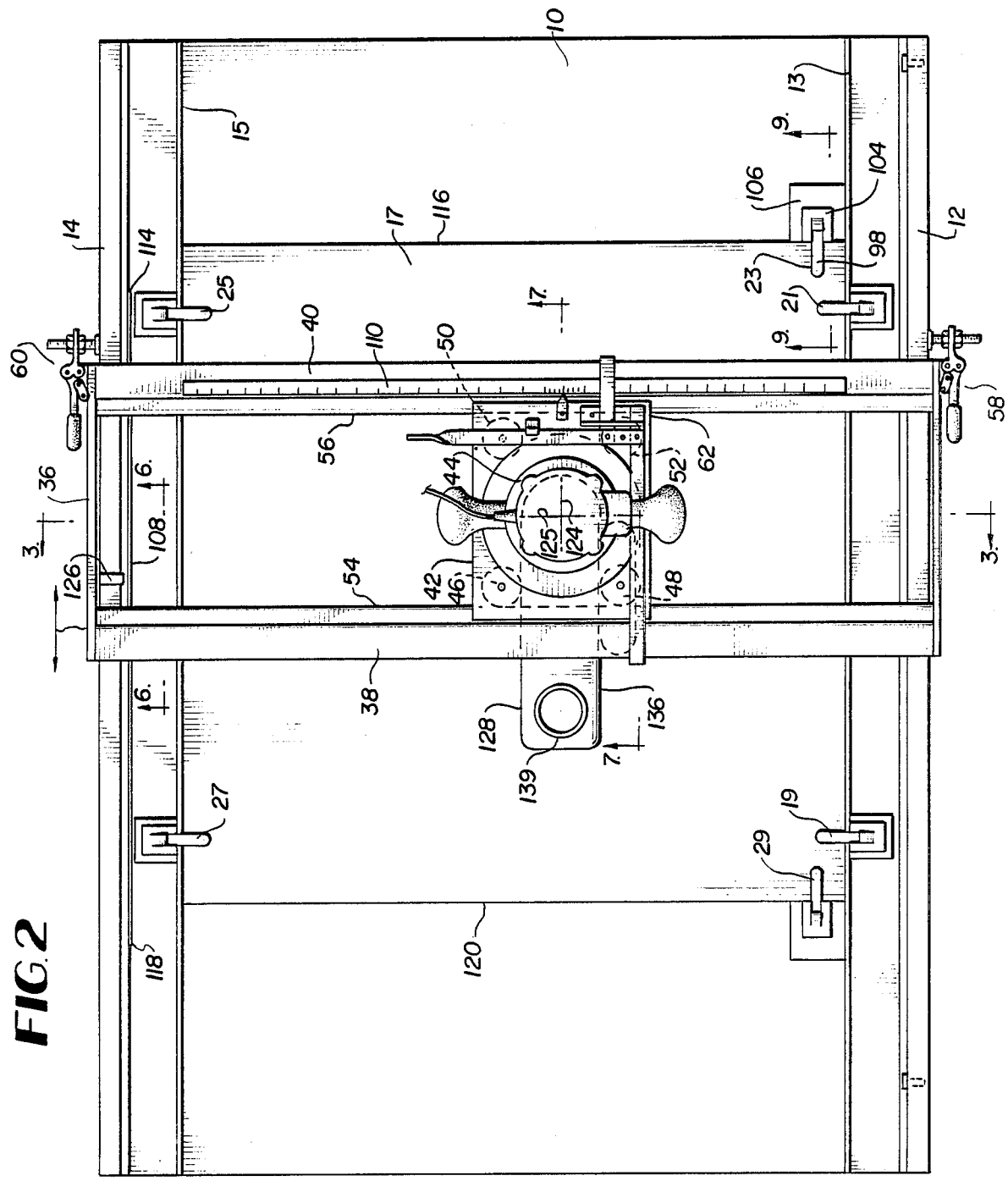
FIG. 2 is a top plan view illustrative of the preferred embodiment of the invention.
Figure 3:
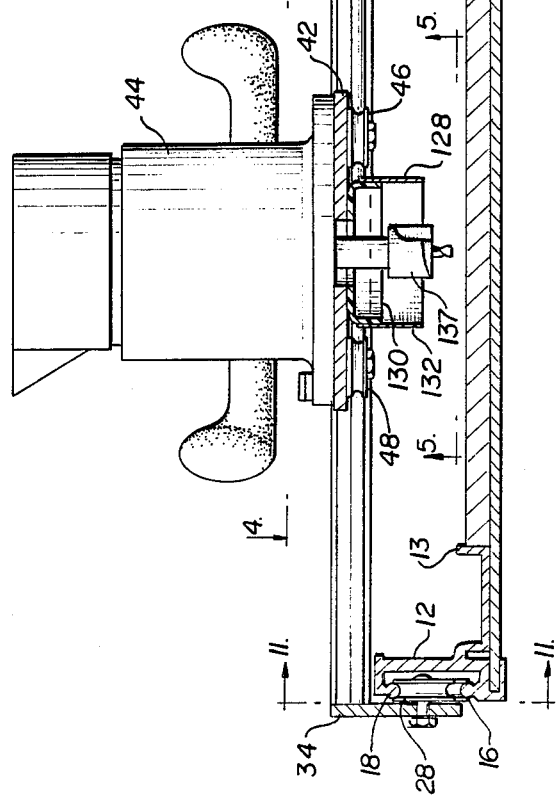
FIG. 3 is a transverse cross sectional view of the invention taken along the lines 3—3 of FIG. 2.

Referring now collectively to the drawings, reference numeral 10, for example, as shown in FIGS. 1, 2 and 3, denotes a generally rectangular metal base plate which is secured to the underside of a pair of elongated side members 12 and 14, comprising channel members, which respectively include opposing vertically oriented rails 16, 18 and 20, 22 (FIG. 3). The rails 16, 18 and 20, 22 define a pair of longitudinal tracks 24 and 26 (FIG. 1) on which two sets of wheels run, one set of which is shown in FIG. 11.

As shown, the set of wheels comprises an upper wheel 28 located between two lower wheels 30 and 32. The wheels are rotatably attached to the side plate member 34 such that the lower wheels 30 and 32 contact the lower rail 16 while the upper rail 26 contacts the upper rail 18. The same configuration exists on the other side of the assembly and comprises a side plate 36 to which is attached three wheels, one of which is shown by reference numeral 38 contacting the upper rail 22.

Secured to the upper portion of the side plates 34 and 36 are two elongated cross members 38 and 40 as shown in FIGS. 1 and 2 which are separated and support a generally rectangular plate 42 upon which is mounted a conventional electrically driven cutting tool 44, and more particularly a router. The plate 42 upon which the router 44 is mounted further includes two opposing pairs of wheels 46, 48 and 50 on the underside thereof as shown in FIG. 5 which respectively contact and ride on horizontally oriented rails 54 and 56 (FIG. 2) which are formed on the inner longitudinal edges of the cross members 38 and 40.

Up to this point what has been described is a pair of rectilinearly movable rail mounted carriages which permit the router 44 to be moved manually longitudinally and laterally across the top of the base plate 10. Movement of the router 44 can be restrained in the longitudinal direction by a pair of manually activated toggle type stop mechanisms 58 and 60 secured to the side plates 34 and 36 while cross movement in the mutually orthogonal direction is restrained by a lever type clamp mechanisms 62 located on the plate 42 adjacent the router 44. This apparatus is depicted generally in FIG. 2.

Figure 8:
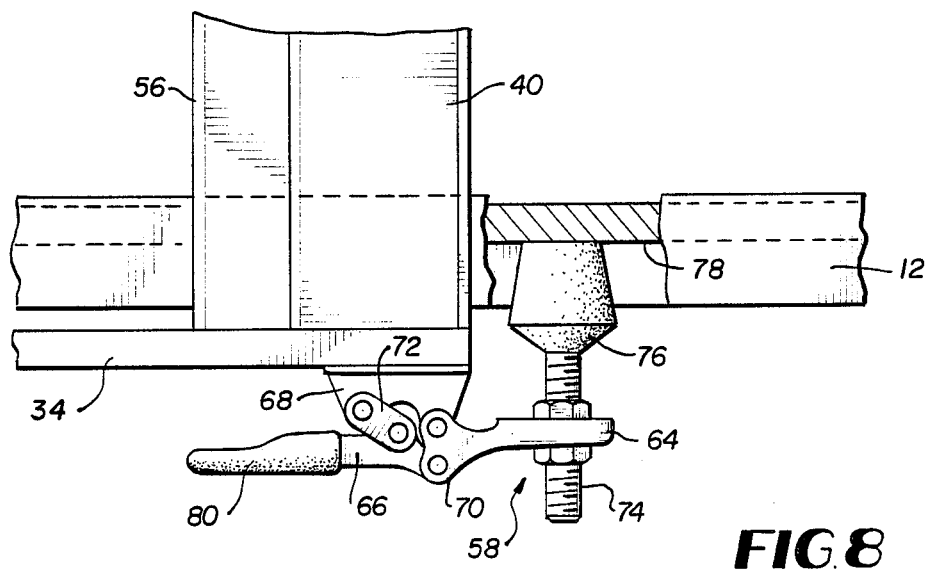
FIG. 8 is a partial cut away view illustrative of the longitudinal movement stop shown in FIG. 2.

The details of one of the toggle stops 58 are further shown in FIG. 8. Referring now to FIG. 8, the mechanism is comprised of a pair of finger elements 64 and 66 which are pivotally connected to an outwardly extending bracket member 68 by means of a pair of links 70 and 72, respectively. The forward element 64 is connected to the threaded shank 74 of a rubber stop 76 which is adapted to engage inner longitudinal side surface 78 of the side member 12. The rear element 66 terminates in a finger actuable tab 80.

In operation, when the tab 80 is moved outwardly from the side member 12, the stop 76 is caused to move away from the surface 78. When a similar action is made on the other side of the fixture, the router 44 and its supporting structural members including the cross members 38 and 40 can be moved longitudinally; however, when the tab 80 is moved inwardly, the rubber stop is caused to abut the surface 88 and any further longitudinal movement of the router 44 will be restricted.

Figure 4:
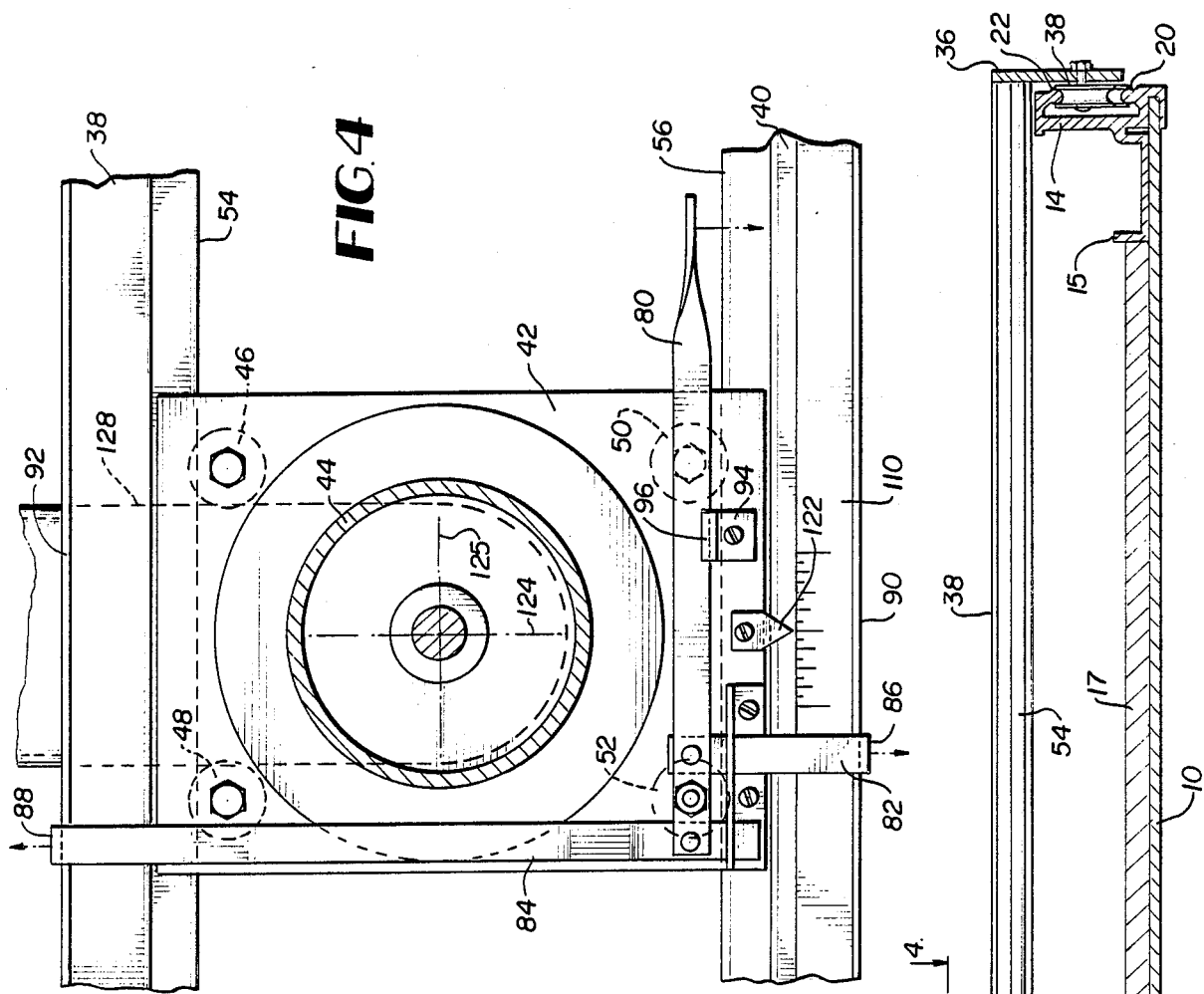
FIG. 4 is a partial cross sectional view of the invention taken along the lines 4—4 of FIG. 3.

With respect to the other stop mechanism 62, the details of which are shown in FIG. 4, it comprises an elongated hand lever 80 which extends across the width of the plate 42 where it is pivotally connected to a pair of mutually offset arms 82 and 84 which respectively extend over the cross members 38 and 40 and terminate outwardly in downwardly projecting end portions 86 and 88 which are adapted to contact the outer longitudinal edges 90 and 92 of cross members 40 and 38.

In operation, when the lever 80 is manually moved inwardly toward the router 44, the arms 82 and 84 move outwardly away from the cross members 38 and 40, releasing the frictional engagement of the outer end portions 82 and 84 with the edges 90 and 92, allowing the router 44 to be manually moved laterally across the assembly between the side channel members 12 and 14. When the lever 80 is then pulled outwardly, the arms 82 and 84 are caused to move inward, whereupon the downward end portions 86 and 88 frictionally engage the surfaces 90 and 92, causing transverse movement of the router 44 to be stopped. A catch element 94 including an upper lift 96 is adapted to engage the hand lever 80 to securely hold it in place at a stop position. Release from the catch is accomplished by depressing the lever 80 downwardly and moving it inwardly where it frees itself from the lift 96.

The longitudinal side channel members 12 and 14 further include inner flange portions 13 and 15 (FIG. 3) which are adapted to receive and hold a rectangular cutting board element 17 and upon which an acoustic tile, not shown, or other workpiece is placed. Six work clamps 19, 21, 23, . . . 29, as shown in FIGS. 1 and 2, operate to hold the tile to be cut on the cutting board 17. Clamps 19 and 21 are located adjacent the side channel member 12 while clamps 25 and 27 are oppositely located adjacent the side channel member 14. Clamps 23 and 29 are located on the front and rear sides of the cutting board 17 to prevent movement of the work in the longitudinal direction.

Figure 9:
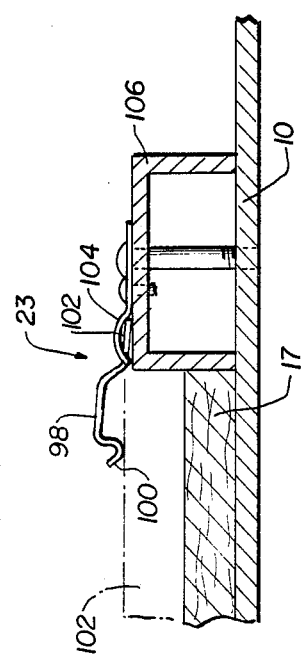
FIG. 9 is a partial cross sectional view of the invention taken along the lines 9—9 of FIG. 2.

The details of the work clamps 19-29 are shown in FIG. 9 wherein one of the work clamps 23, for example, is comprised of an elongated metal finger element 98 which has an outer end 100 which is bent to contact the upper surface of an acoustic tile 102, shown in phantom, while its inner end constitutes a flat portion 102, which is constrained by a spring type retainer element 104 and which is secured to a metal block 106 which abuts the edge of the cutting board 17 and the acoustic tile 102 when placed thereon. The finger element 98 can be manually flipped upwardly, and as a consequence, the inner end portion 108 will be held in a vertical position by a spring member 104. However, upon being flipped downwardly, it will maintain a fixed position. Thus what is provided is a two position hold down mechanism.

The acoustic tile cutting apparatus according to the present invention further includes a longitudinal and transverse measuring scale 108 and 110, as shown in FIG. 1, affixed to the inner side wall of the longitudinal channel member 10 and to the top surface of the cross member 40, respectively. The scales 108 and 110 are typically 24 in. in length and are located so that accurate cutting measurements can be made for acoustic tile members placed on the cutting board 17. The scale 110 which is located across the cutting board 17 on the cross member 40 is centered, as shown in FIG. 2, so that its extremities are coincident with the longitudinal edges of the cutting board 17 and the channel flanges 13 and 15 (FIG. 3). The scale 108, however, is offset relative to the longitudinal dimension of the cutting board 17 so that its forward edge 114 as shown in FIG. 1 is set back relative to the forward edge 116 of cutting board 17. This means that the rear edge 118 of the scale 108 extends beyond the rear edge 120 of the cutting board as shown in FIG. 2.

Figure 6:
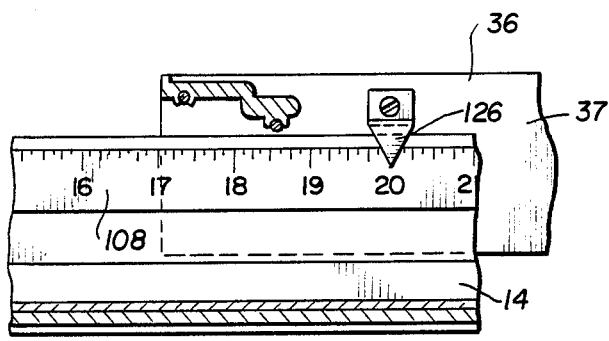
FIG. 6 is a partial cross sectional view of the invention taken along the lines 6—6 of FIG. 2.

It is important to note that the scale indicia on the transverse scale 110 (FIG. 1) is calibrated in both directions; however, the numbering is offset in each direction by 2.0 in. as shown in FIG. 10. This is done specifically for the purpose of cutting acoustic tile so as to accommodate the reveal edge for directional tile panels where a stepped router bit, hereinafter to be described, is utilized in connection with the router 44. Further as shown in FIGS. 4 and 6, the plate 42 containing the router 44 includes a pointer 122 which is aligned with the longitudinal axis 124 of the router 44. The end plate 36 (FIGS. 1 and 2) includes a pointer 126 affixed to the inside surface 37 directed to the linear scale 108; however, it is rearwardly offset from the lateral axis 124 of the router 44 as shown in FIG. 2 by a 2.0 in. offset. This is also done to automatically accommodate fabrication of a reveal edge for a directional tile. This permits the cutting of acoustical tile with a reveal edge with a minimum of effort and skill since it is only necessary to move the router 44 so that the scale pointers 122 and 126 line up opposite the respective scale indicia of the scales 110 and 108 for the size of panel to be cut.

Additionally, there is provided means whereby the dust and other material resulting from an acoustic tile cutting operation is directed away from the workpiece 102 so as to provide not only a clean but a safe working environment. To this end there is provided an elongated housing member 128 which is attached to the underside of the router plate 42 and which extends to the rear of the apparatus as shown in FIGS. 1 and 2.

Figure 7:
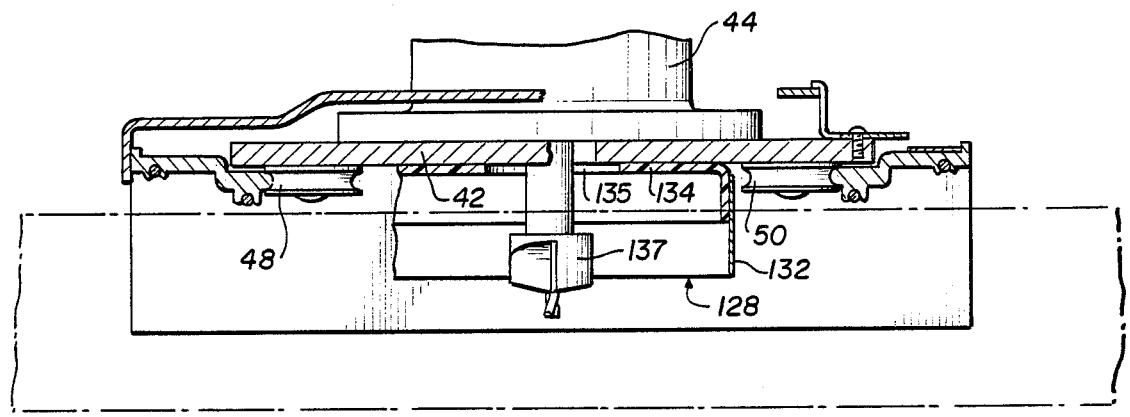
FIG. 7 is a partial cross sectional view of the invention taken along the lines 7—7 of FIG. 2.
Figure 12:
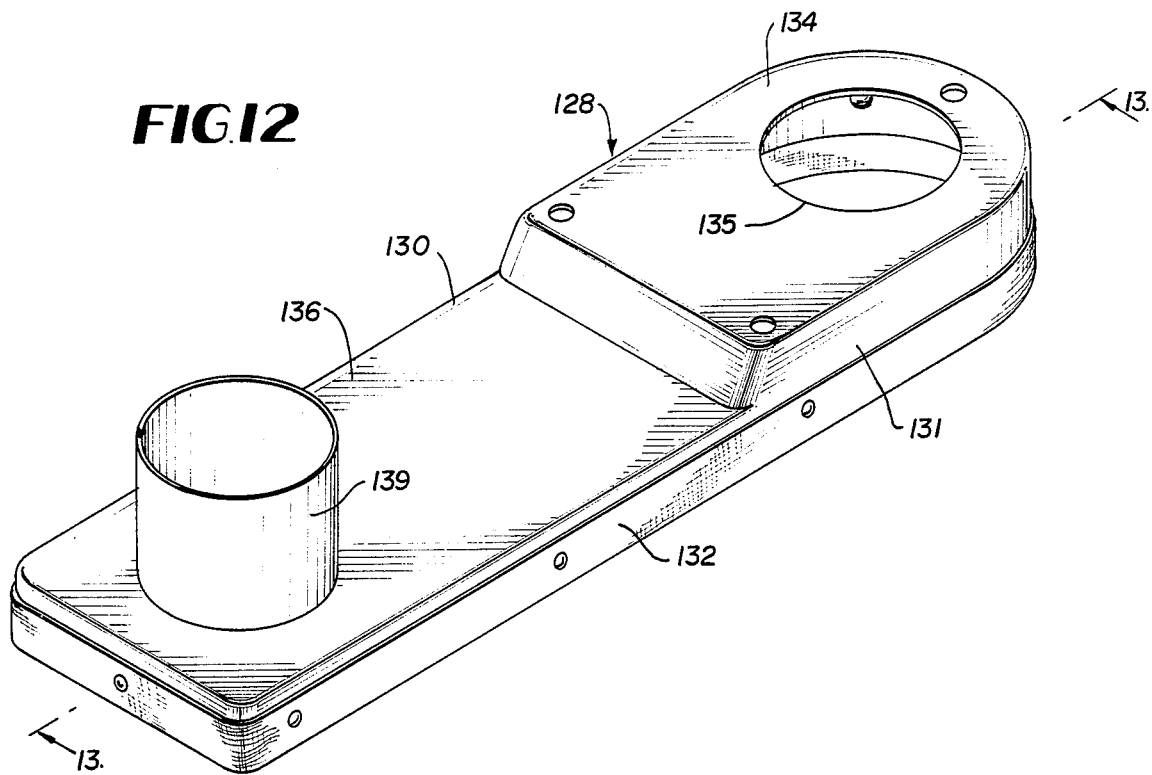
FIG. 12 is a perspective view of the dust collector housing attached to the underside of the router carriage assembly.
Figure 13:
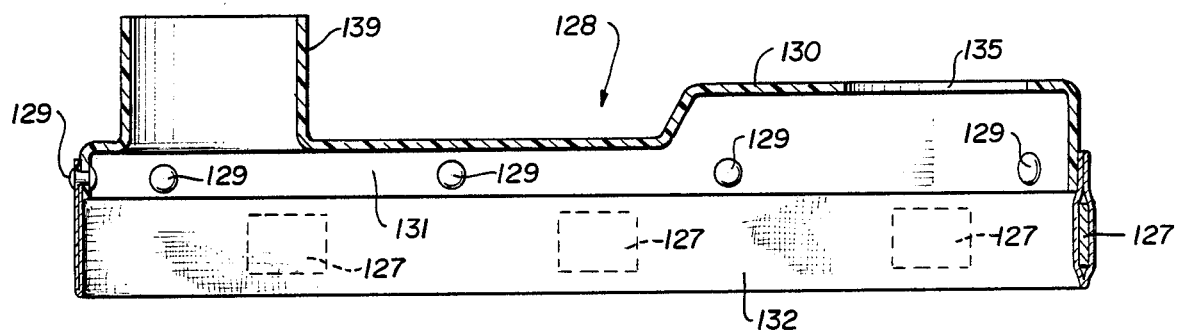
FIG. 13 is a sectional view of FIG. 16 taken along the lines 13—13 thereof.

The details of the housing 128 are shown in FIGS. 12 and 13. The housing, as illustrated, comprises an upper stepped body portion 130 made from plastic and lower skirt portion 132 made from canvas or the like. The upper body portion 128 includes a raised rounded inner end section 134 which is attached to the router plate 42 on a generally rectangular outer end section 136 which protrudes rearwardly of the router assembly. The inner end section 134 also has a hole 135 formed therein through which a router bit 137 passes as shown in FIGS. 5 and 7. The outer end section also includes a short cylindrical segment 139 which is adapted to act as a fitting for a hose, not shown, coupled to a vacuum source including a dust bag or other receptacle, also not shown, which receives the sawdust drawn from the area surrounding the router bit 137 during an acoustic tile cutting operation.

The skirt 132 is fastened to the lower edge 131 of the body portion 130 by rivets 129, or the like, and extends around the periphery of the entire housing 128. The skirt also extends downwardly to the surface of the workpiece to confine the dust to the housing interior. A plurality of stiffening members 127 are sewn into the body of the skirt to maintain its shape when the vacuum source is energized to remove the saw dust from the housing.

Figure 14:
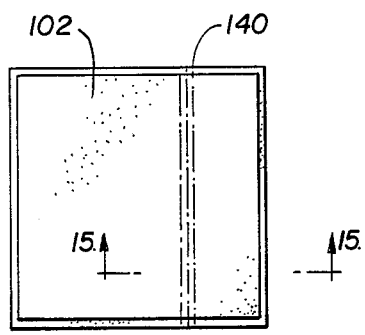
FIG. 14 is a top planar view of a typical rectangular acoustic tile to be cut by the subject invention.
Figure 15:
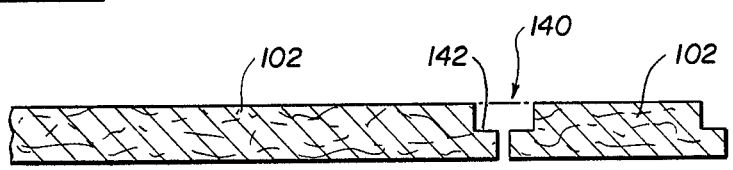
FIG. 15 is a cross sectional view taken along the lines 15—15 of FIG. 14 and being illustrative of the reveal edge produced by the subject invention.
Figure 16:
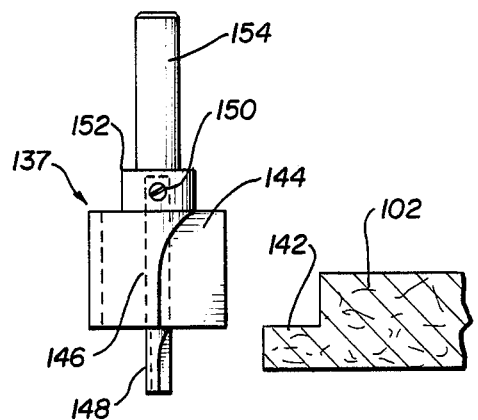
FIG. 16 is a front plan view illustrative of the router bit utilized by the router mounted on the fixture shown in FIGS. 1-3.

Referring now briefly to FIGS. 14–17 and more particularly to FIG. 14, reference numeral 102 designates an acoustic tile panel which is desired to be cut in two at 140 and having a reveal edge 142 as shown in FIGS. 15 and 16. The reveal edge 142 is provided as a result of the router bit configuration which is shown in FIG. 4 and comprising a stepped router bit 137. The bit 137 includes a relatively larger diameter upper router bit section 144 having a center bore 146 drilled therein and into which there is placed and secured a relatively smaller diameter router bit section 148. As shown, a smaller router bit section 148 is held in place by a set screw 150 at the collar 152 adjoining the shank 154. Typically the outer diameter of the larger router bit section 144 is 1.0 in., while the outer diameter of the smaller router bit section is ⅛ in. By varying the relative dimensions of the diameters of the router bit sections 144 and 148, the dimension of the reveal edge 142 can be made to have any desired dimension; however, the above mentioned dimensions are required for standard size ceiling tile installations.

Figure 17:
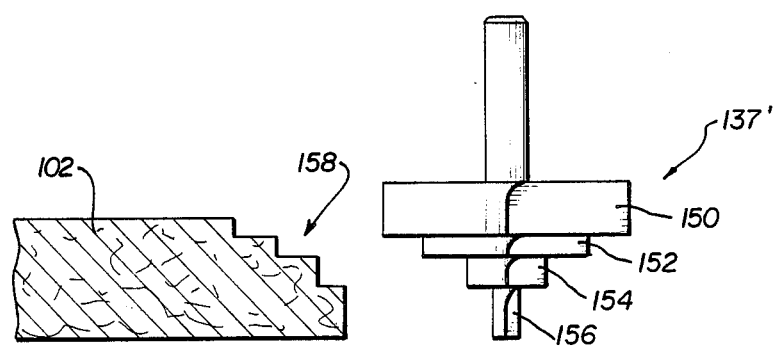
FIG. 17 is a front plan view illustrative of a modified router bit which can be utilized by the subject invention.

FIG. 17 is intended to disclose that, when desirable, a router bit 137' which is comprised of not two, but four bit sections 150, 152, 154 and 156 can be fabricated and used to produce a stair step edge configuration 158.

Thus what has been shown and described is a new and improved router guide assembly which permits rectilinear movement of a router for accurately cutting acoustic tile panels having a reveal edge along the line of the cut.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

We claim:

1. A router guide assembly comprising:
   a rectilinear base;
   means for holding a workpiece in position on said base;
   a pair of parallel elongated side members secured to the base and each side member including a pair of aligned vertically oriented rails extending longitudinally adjacent opposing side edges of the base;
   a pair of side plates located adjacent said side members and respectively including a set of wheels engaging respective pairs of said vertically oriented rails;
   a pair of parallel elongated cross members secured to said side plates, each said cross member including an inner horizontally oriented rail mutually opposed to one another;
   a router mounting plate for carrying a router located intermediate said cross member and including a set of wheels engaging said horizontally oriented rails, said router thereby being movable in two mutually orthogonal directions;
   manually activated stop means for selectively restraining movement of the router in both said orthogonal directions; and
   linear measurement means including predetermined indicia thereon located on one of said side members and one of said cross members for making accurate linear cut on said workpiece.

2. The router guide assembly as defined by claim 1, and additionally including a bit on said router for cutting a reveal edge in said workpiece, and wherein said workpiece comprises a panel of acoustical tile.

3. The router guide assembly as defined by claim 2 wherein said measurement means includes a measurement offset to accurately position the location of the reveal edge.

4. The router guide assembly as defined by claim 3 wherein said linear measurement means on said one side member comprises a physically offset linear scale on an inside surface of said side members.

5. The router guide assembly as defined by claim 3 wherein said linear measurement means on said one cross member comprises a linear scale having offset measurement indicia thereon in mutually opposing directions.

6. The router guide assembly as defined by claim 1 wherein said base comprises a base plate and additionally including a cutting board member on said base plate for receiving said workpiece.

7. The router guide assembly as defined by claim 6 and wherein said means for holding said workpiece comprises a set of flip type spring biased finger elements arranged around the perimeter of said cutting board.

8. The router guide assembly as defined by claim 1 wherein said stop means includes a pair of toggle type stop mechanisms secured to said side plates and having means for engaging and disengaging an outside surface of said elongated side members.

9. The router guide assembly as defined by claim 1 wherein said stop means includes a linear type clamp mechanism located on said router mounting plate for frictionally engaging and disengaging said cross members.

10. The router guide assembly as defined by claim 9 wherein said clamp mechanism further includes a pair of mutually offset elongated arm members connected to a pivoted hand lever, said arm members having respective end portions for frictionally engaging the outer edges of said cross members.

11. The router guide assembly as defined by claim 1 and additionally including means located on the underside of said router mounting plate for restricting waste material resulting from a routing operation to an area in close proximity to the router and thereafter directing said material away from the router.

12. The router guide assembly as defined by claim 11 wherein said restricting and directing means comprises an elongated housing structure which extends outwardly from beneath said router mounting plate and includes means for coupling to external waste disposal means.

13. The router guide assembly as defined by claim 12 wherein said housing includes an aperture in the region beneath said router mounting plate through which a router bit passes and wherein said coupling means comprises a vertically oriented coupling for a vacuum hose.

14. The router guide assembly as defined by claim 13 wherein said housing structure additionally includes a downwardly extending skirt member which extends around the periphery of the housing structure.

15. The router guide assembly as defined by claim 14 wherein said skirt member incudes a flexible body part and having a plurality of stiffening members secured to said body part.

16. The router guide assembly as defined by claim 1 and additionally including a router bit on said router having a stepped down cutting edge.

17. The router bit assembly as defined by claim 16 wherein said router bit has an outside diameter of 1.0 in. which steps down to $\frac{1}{8}$ in. for cutting an acoustic tile.

* * * * *